United States Patent [19]

Flygstad et al.

[11] 4,216,507
[45] Aug. 5, 1980

[54] AUTOMATIC TAPE PLAYER-CHANGER

[75] Inventors: Dean W. Flygstad, St. Paul; James F. Petelle, Hopkins, both of Minn.

[73] Assignee: Telex Communications, Inc., Minneapolis, Minn.

[21] Appl. No.: 904,446

[22] Filed: May 9, 1978

Related U.S. Application Data

[63] Continuation-in-part of Ser. No. 720,817, Sep. 7, 1976, abandoned.

[51] Int. Cl.² .................. G11B 15/68; G11B 21/08
[52] U.S. Cl. ........................... 360/92; 360/78; 360/106
[58] Field of Search ....................... 360/92, 78, 106

[56] References Cited
U.S. PATENT DOCUMENTS

| | | | |
|---|---|---|---|
| 3,752,484 | 8/1973 | Ban | 360/92 |
| 3,816,851 | 6/1974 | White et al. | 360/92 |

*Primary Examiner*—Robert S. Tupper

[57] ABSTRACT

A magnetic tape player-changer for sequentially playing endless, multi-track magnetic tapes housed in cartridges. The player-changer includes a magazine housing a plurality of cartridges, and a track along which the magazine is moved to sequentially position cartridges in a playing position. The magazine is provided with a surface having a plurality of intersecting, curved grooves, and the player-changer is provided with a driven, revolvable cam which rides in the grooves. The cam and grooves are so oriented as to smoothly advance the magazine to position sequential cartridges in the playing position with little noise. The player-changer includes transducer stepping and step-counting means for advancing a transducer from one pair of tracks to another of a tape and for counting the steps so as to advance a new cartridge into the playing position when all of the tracks of the previous tape have been played. Means are also provided to reverse the travel of the magazine to its original position when all of the tape cartridges have been played. The principles of our invention are also applicable to rotary magazines for continuously, sequentially indexing magnetic tape cartridges to a playing position.

14 Claims, 20 Drawing Figures

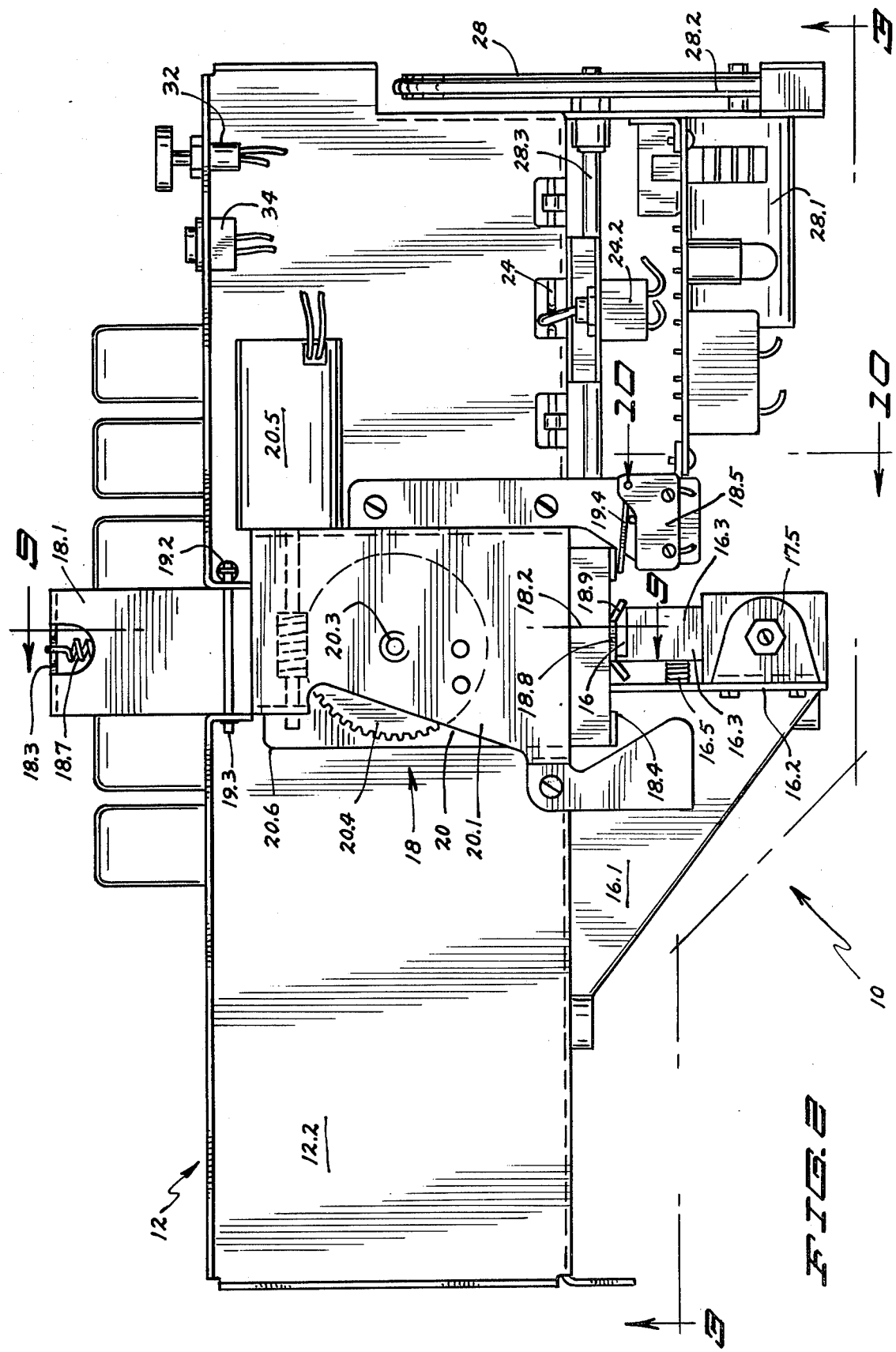

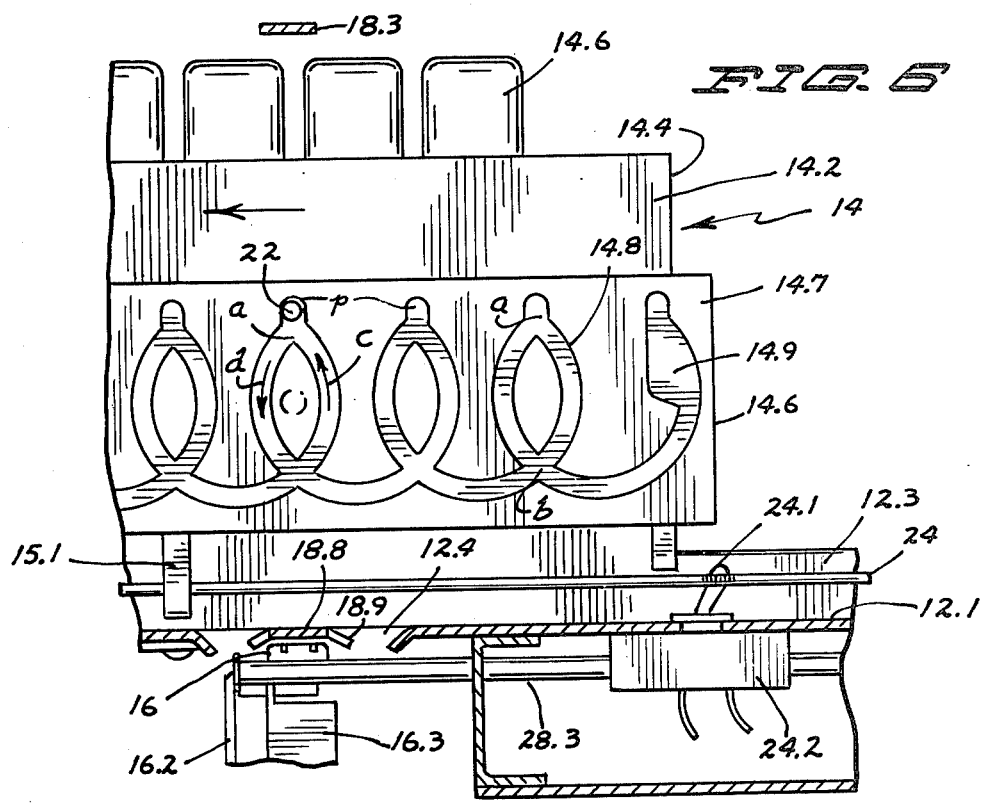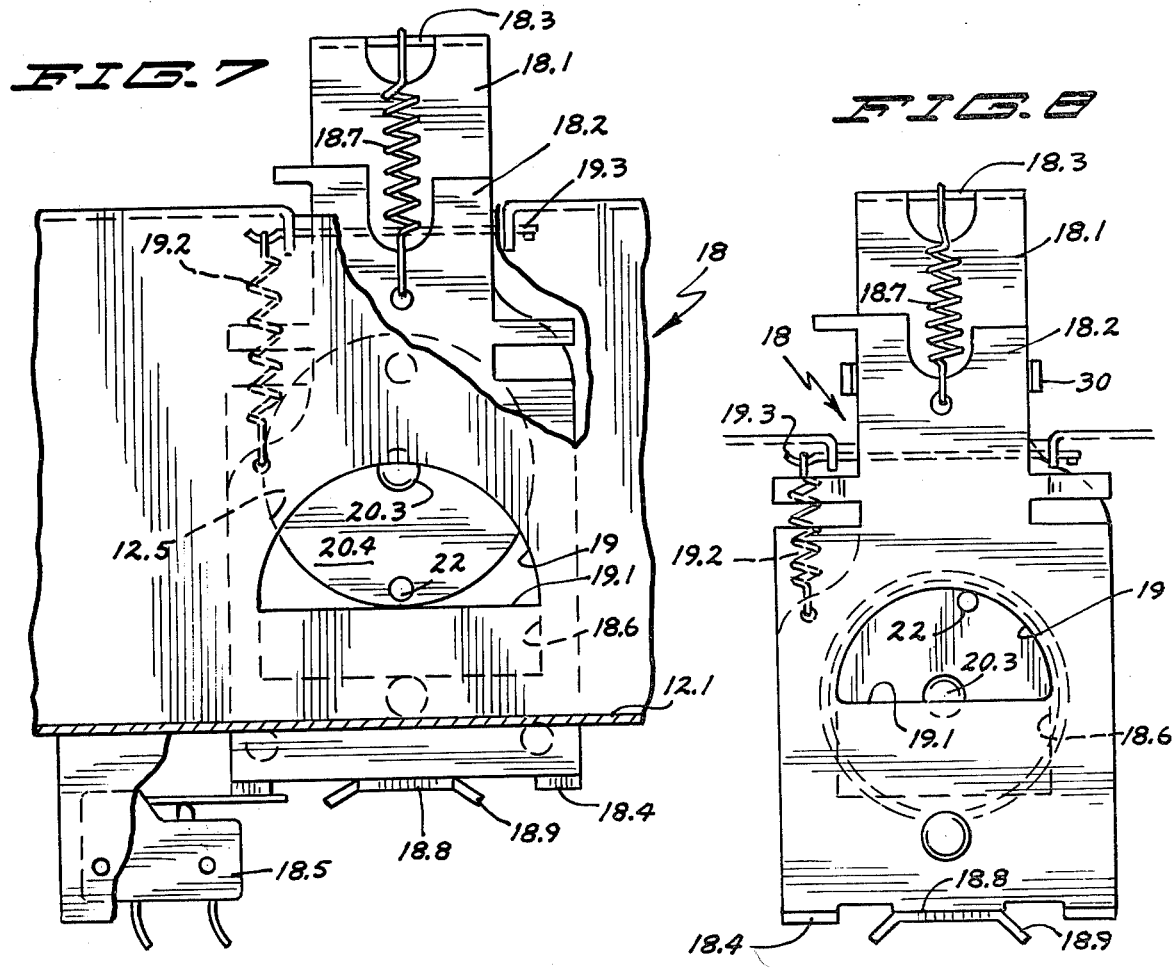

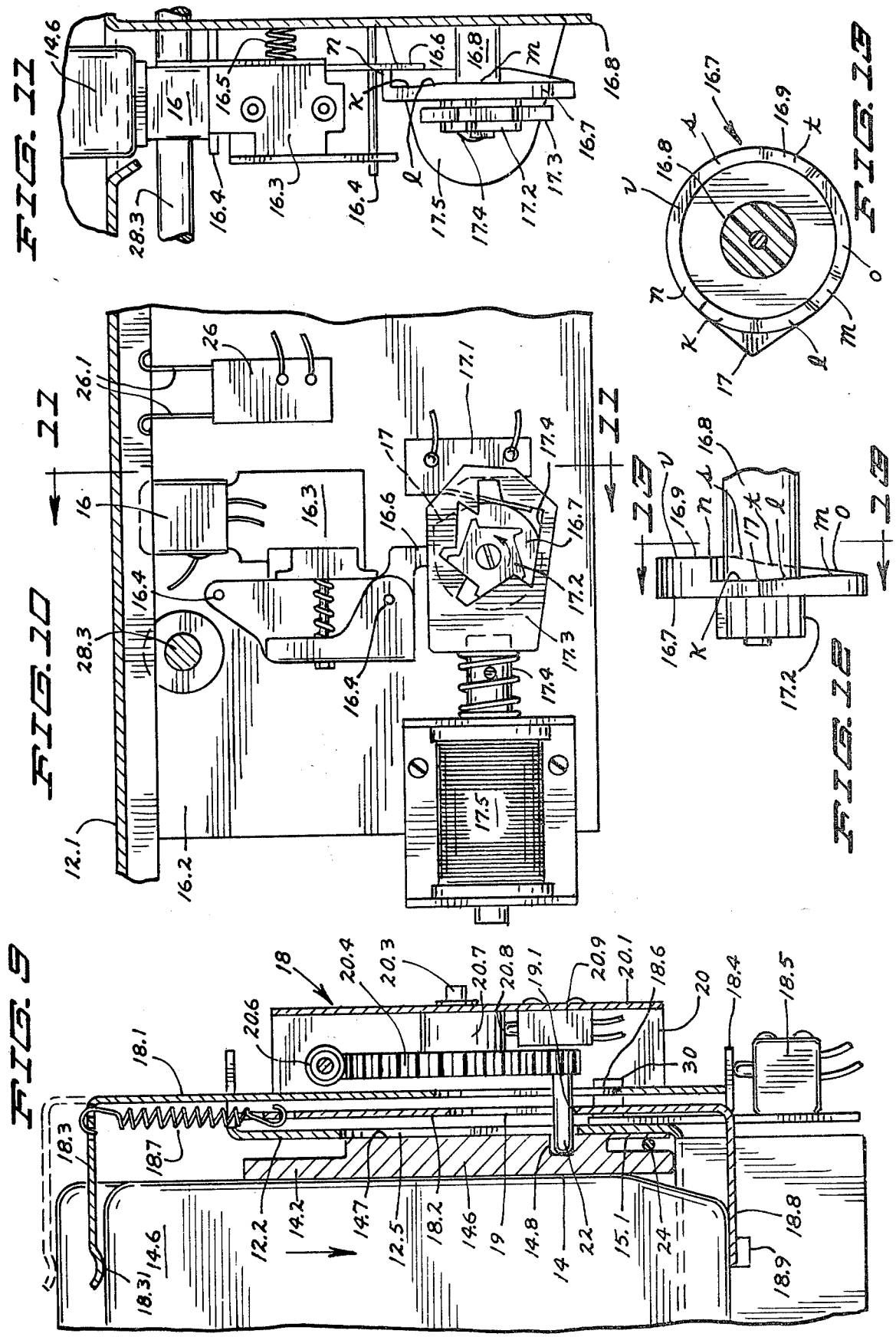

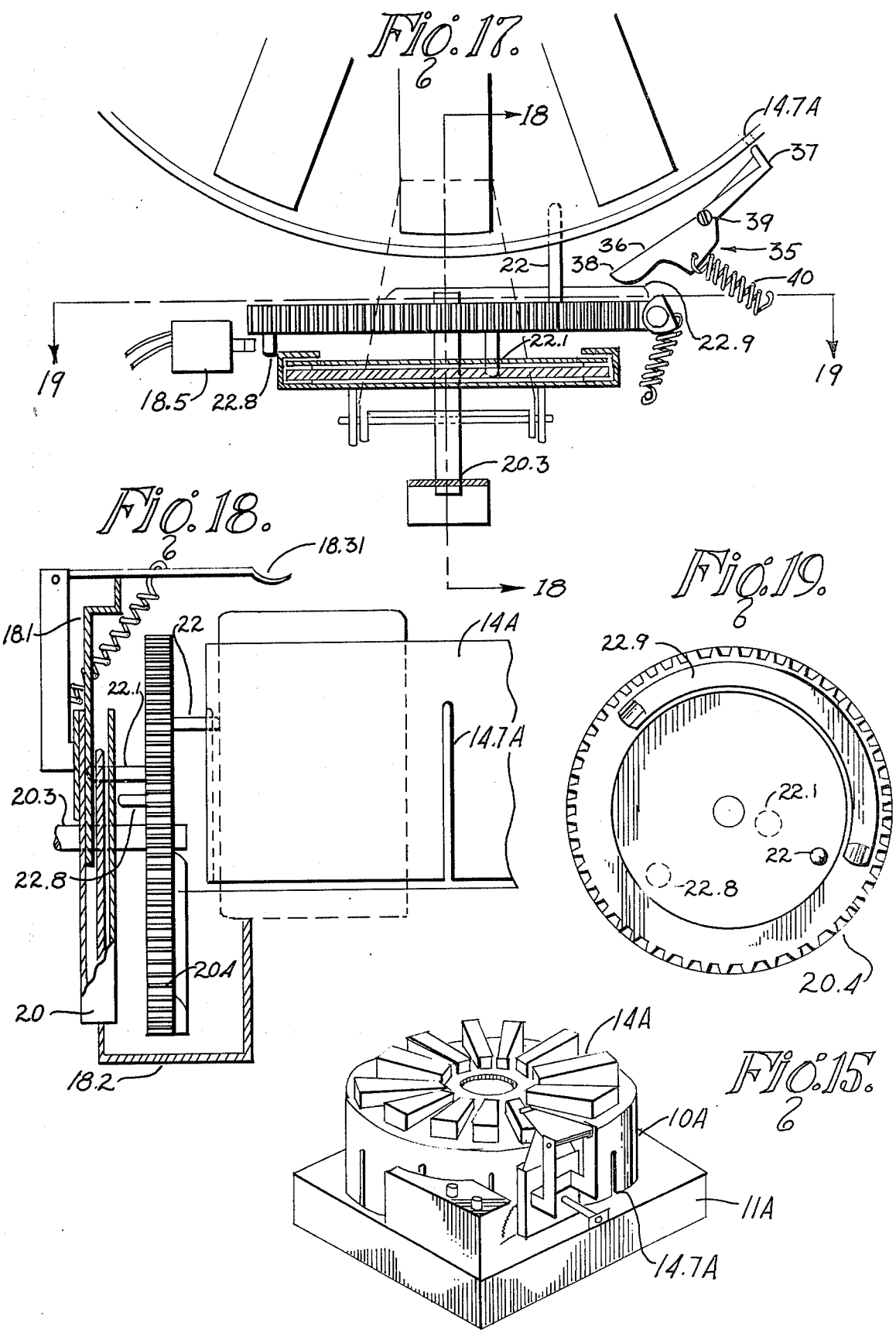

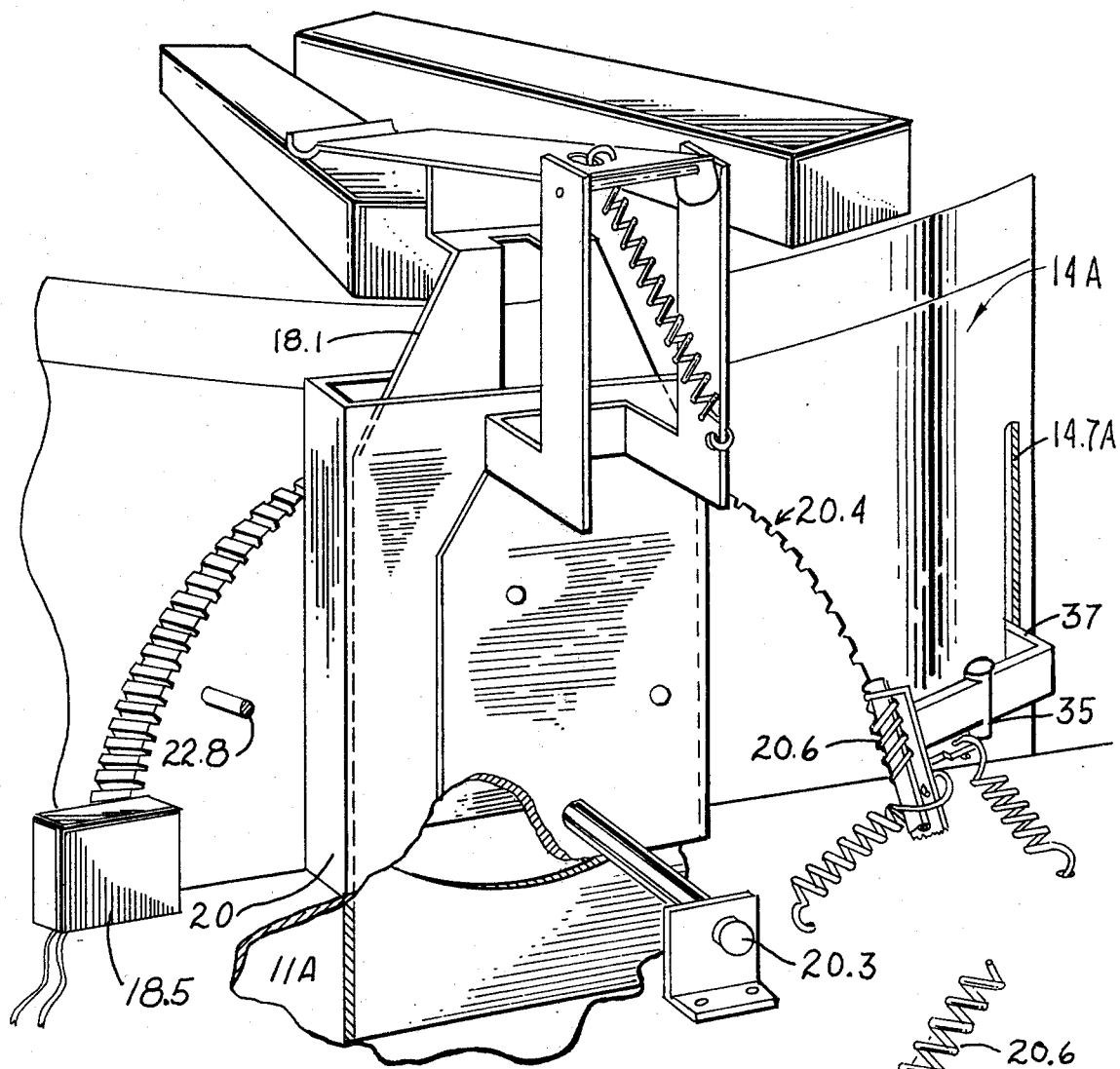
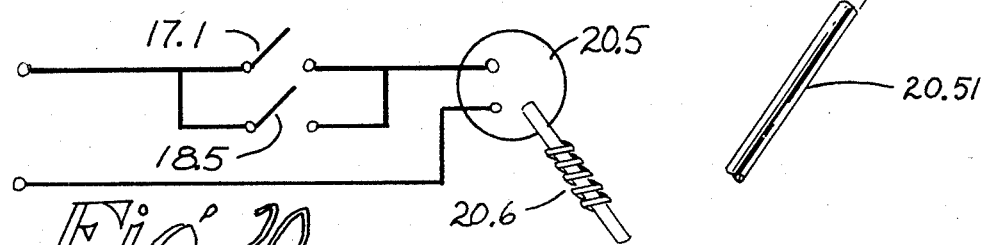

AUTOMATIC TAPE PLAYER-CHANGER

CROSS REFERENCES TO COPENDING APPLICATIONS

This is a continuation-in-part of application Ser. No. 720,817, filed Sept. 7, 1976 now abandoned.

BACKGROUND OF THE INVENTION

The present invention relates to magnetic tape playing machines, and particularly to those machines permitting automatic changing of tapes which have been played. A number of player-changer devices for magnetic tapes have been proposed in the prior art. Devices of this type are exemplified in U.S. Pat. Nos. 3,592,975 and 3,752,484. The devices of these patents employ endless magnetic tape cartridges, and in the latter patent, the cartridges are stacked one atop another in a guide box and are ejected from the machine when they have been played. In the former patent, cartridges are arranged in a carrousel fashion. In both patents, and transducer and drive devices are movable into and out of contact with the cartridges.

It would be desirable to provide an automatic player-changer for magnetic tapes in which endless tape cartridges could be quickly and easily inserted into and removed from a magazine, and in which the movement of the magazine to position sequential cartridges in a playing position would be smooth and comparatively noiseless. Moreover, it would be highly desirable to provide the player-changer with mechanical counter and transducer stepping means of simple construction for stepping the transducer from one position to the next as the playing of sequential tracks of a multi-track endless magnetic tape proceeds.

SUMMARY OF THE INVENTION

The present invention provides a magnetic tape player-changer which is particularly adapted to sequentially play a plurality of cartridges containing multi-track endless tapes.

The player-changer includes a magazine for housing a plurality of cartridges, magazine advancement means, and a generally straight track along which the magazine may be advanced to sequentially position cartridge in a playing position with the tracks of a tape in playing proximity with a transducer. The magazine is provided with a surface having a plurality of intersecting, curved gooves; desirably, the grooves each are generally circular but are incomplete at their upper ends, the circular grooves being aligned horizontally and lying in a vertical plane with adjacent circular grooves intersecting at their upper, incomplete ends and having upward recesses at these intersections. Another embodiment of a player-changer utilizes a rotary magazine for continuously, sequentially indexing cartridges into playing position with a suitable transducer. The rotary magazine is provided with a grooved, peripheral surface, each of a plurality of circumferentially spaced slots or grooves are disposed for sequential, driven engagement by a revolvable cam. The changer includes cartridge advancement means comprising a driven, revolvable cam riding in camming contact with the grooves, the cam and grooves being so oriented as to cause the magazine to be smoothly advanced along its track to position sequential tape cartridges in a playing position in response to sequential revolutions of the cam. The cam desirably revolves in a circular path in a plane parallel to the plane of the grooves. During revolution of the cam, the latter rides smoothly in the grooves without movement of the magazine until the cam reaches the upper groove intersection at which point the cam enters and bears against the walls of the downwardly open recess at the intersection to advance the magazine to a position in which the cam can smoothly revolve in the adjacent groove.

The player-changer is provided with cam-driven pressure and lifts arms to respectively press a tape cartridge directly downwardly under spring pressure into playing contact with a transducer as the cam approaches a bottom position in the grooves, and to lift the cartridge upwardly away from the transducer as the cam revolves upwardly to advance the magazine.

The present invention also provides, in a tape player-changer such as that described above, transducer stepping and counting means which not only steps the transducer from one pair of tracks of a tape to another but which also mechanically counts the number of steps afforded the transducer in playing of a single multi-track tape, the stepping and counting means signaling for operation of the cartridge advancement means when all of the tracks of a tape have been played and also stepping the transducer back to its initial position for playing the tracks of a new tape advanced into the playing position.

The stepping and counting means desirable includes a rotatable camming member having a plurality of camming surfaces, and means for sequentially rotating the member into predetermined rotational positions in response to completion of the playing of each track, or pair of tracks, of an endless tape. The rotatable member includes a series of adjacent camming surfaces which sequentially urge the transducer into playing contact with sequential tracks of a tape as the member is rotated into sequential rotation positions. The rotatable member also includes one or more separate camming surfaces which are operational to energize the magazine advancement means one or more times during each full revolution of the rotatable member; the magazine advancement means, in response, causes further rotation of the rotatable member to step the transducer back to its original position. The described transducer stepping and step-counting means avoids the necessity of using sophisticated and expensive electronic counters and logic circuits.

DESCRIPTION OF THE DRAWINGS

FIG. 1 is the plan view of the player-changer of the invention with the tape cartridge which is ordinarily in the playing position being removed to show internal mechanism;

FIG. 6 is a cross-sectional, broken away view similar to that of FIG. 5 and showing the device in the magazine-transporting position;

FIG. 7 is a cross-sectional, broken away view showing the device of the invention is a cartridge-playing position;

FIG. 8 is a view similar to that of FIG. 7 but showing the device in a magazine-transporting position;

FIG. 9 is a broken away, cross-sectional view taken along 9—9 of FIG. 2;

FIG. 10 is a broken away, cross-sectional view taken along line 10—10 of FIG. 5;

FIG. 11 is a broken away, cross-sectional view taken approximately along line 11—11 of FIG. 10;

FIG. 12 is a partial, broken away view of a transducer-positioning cam shown also in FIG. 11;

FIG. 13 is a cross-sectional view taken along line 13—13 of FIG. 12;

FIG. 14 is a partial circuit diagram relating to particular features of the invention;

FIG. 15 is a perspective view of a further embodiment of the invention showing a rotary magazine;

FIG. 16 is an enlarged view of a portion of FIG. 15;

FIG. 17 is a plan view of the apparatus of FIG. 16;

FIG. 18 is a sectional view of FIG. 17, taken along section line 18—18;

FIG. 19 is a section view of FIG. 17, taken along section line 19—19; and

FIG. 20 is an electrical schematic diagram for embodiment of FIGS. 15-19.

DETAILED DESCRIPTION OF THE PREFERRED EMBODIMENT

Figure 2:
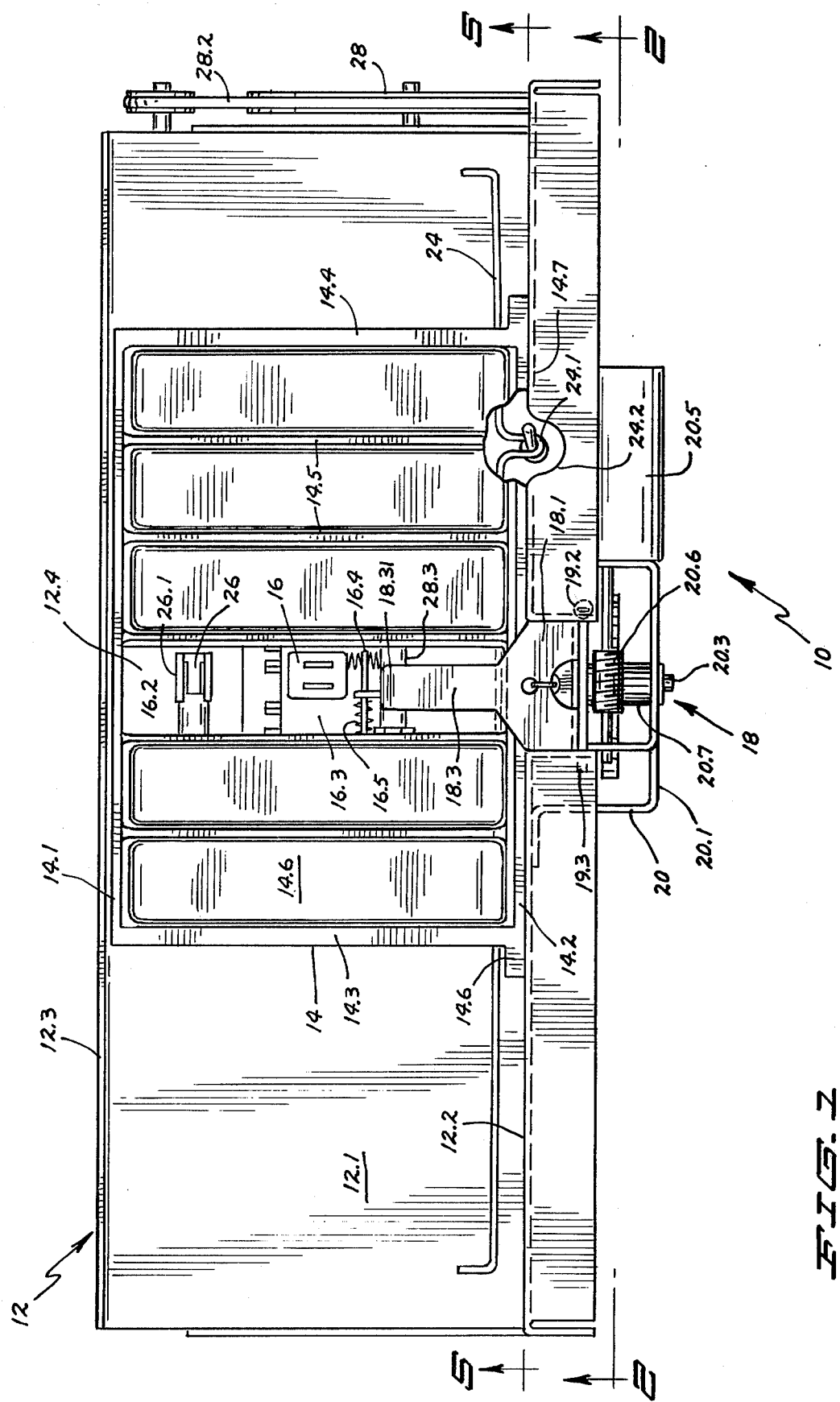
FIG. 2 is a rear view of the player-changer taken along line 2—2 of FIG. 1.
Figure 3:
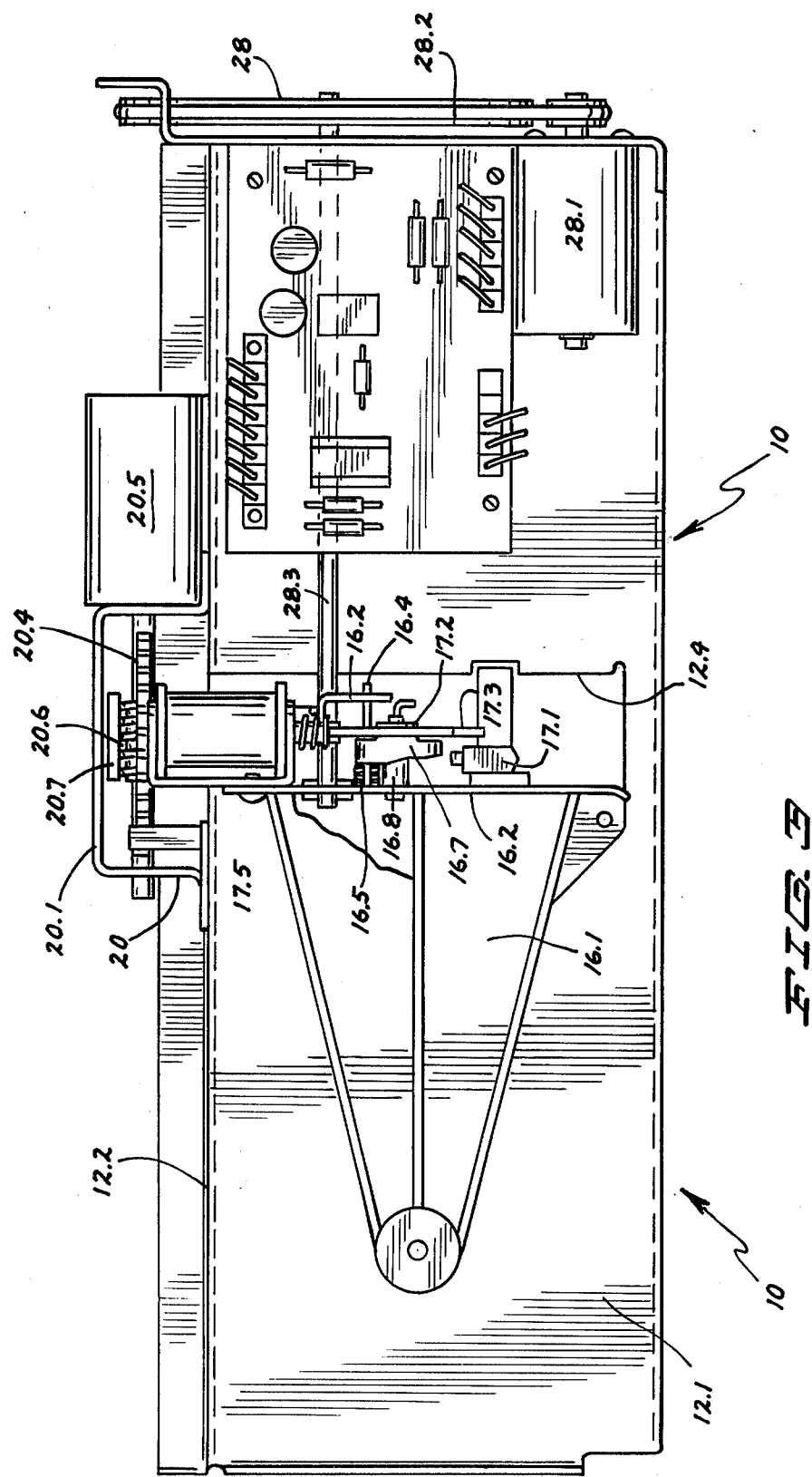
FIG. 3 is a bottom view of the player-changer of the invention taken along line 3—3 of FIG. 2.

FIGS. 1-4 show the general construction of the player-changer of the invention which is designated generally as 10. An elongated, flat support designated generally as 12 is L-shaped in cross section and provides a generally horizontal plate or track 12.1 and a generally vertical plate forming a rear wall 12.2. The support 12 has suitable end walls (not shown) at its ends which support the player-changer on a horizontal surface such as a table top with the track 12.1 well above the horizontal surface. It will be understood that a suitable enclosure or housing (not shown) is provided to lend an aesthetic appearance to the player-changer and to protect it from dirt and dust. For ease of understanding, only the internal mechanism of the player-changer is depicted in the drawing.

Referring to the drawing in general, a removable, generally box-shaped magazine 14 is provided with front and rear walls 14.1, 14.2 and end walls 14.3, 14.4. The magazine has an open, unobstructed top and bottom. The bottom edges of the front and rear walls are adapted to ride on the upper surface of the track 12.1, as shown best in FIGS. 4-6. The track 12.1 has an upturned front edge 12.3 to slidingly retain the magazine on the track. Extending between the front and rear walls of the magazine are a plurality of spaced webs 14.5 providing the magazine with a plurality (e.g., six) spaced compartments within which may be slidingly received a plurality of tape cartridges 14.6, the cartridges being movable upwardly and downwardly in the magazine. The cartridges may be of the well known endless tape variety, and are so oriented in the magazine as to present the exposed section of the tape downwardly. An opening 12.4 is provided in the track intermediate its ends, and a transducer 16 is supported in this opening so as to come into playing contact with the exposed tape. A transducer stepping mechanism, which will be described in detail below, is also supported beneath the track 12.1.

The rear wall 12.2 of the support is provided with a generally circular opening, and mechanism shown generally as 18 is supported to the rear of this rear wall to transport the magazine along the slide, as will be subsequently explained. This mechanism includes vertically movable pressure and lift slides 18.1, 18.2 for pressing a cartridge downwardly into playing contact with the transducer 16 and for lifting the cartridge out of contact with the transducer.

Figure 4:
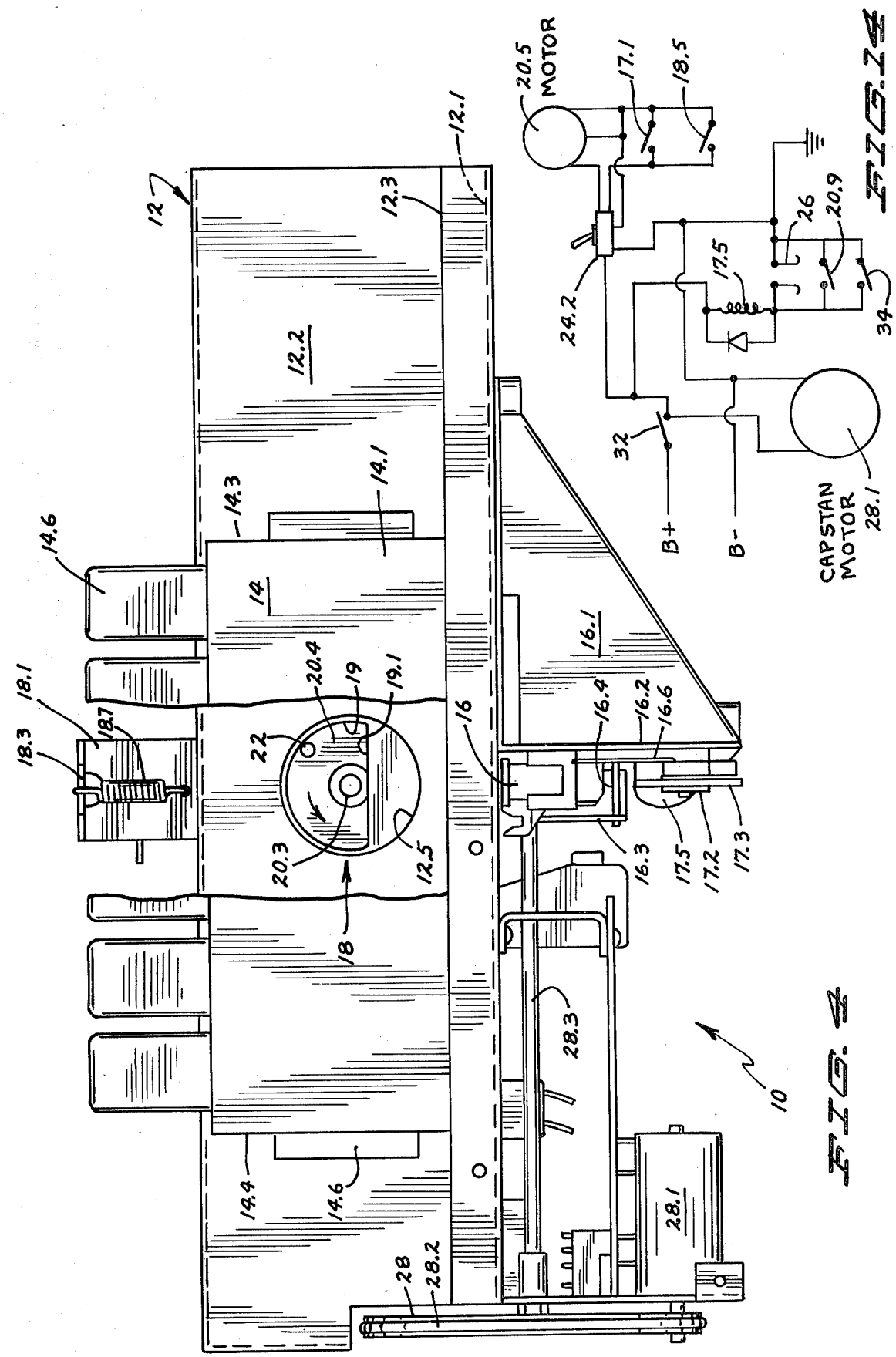
FIG. 4 is a front view, partially broken away, of the player-changer as the latter advances a magazine therein.

Referring first to the mechanism by which the magazine 14 is advanced along the track 12.1, the rear wall 14.2 of the magazine is provided with a thickened section 14.6 extending along its length and having a rearwardly facing surface 14.7 closely confronting the rear wall 12.2. The surface 14.7 is provided with a series of intersecting, generally circular grooves 14.8 (FIGS. 4, 6 and 9). The circular grooves are aligned horizontally along the length of the magazine, and each circular groove is incomplete upwardly. Each circular groove intersects a neighboring circular groove at two points, and the upper points of intersection including an upwardly recessed cavity "p" having walls providing a cam abutment. The intersections are designated "a" and "b" in FIG. 5 with the cam abutment shown adjacent the intersection "a". As thus described, the grove 14.8 is continuous from one end of the magazine to the other. The ends 14.9 of the groove are made somewhat larger, as depicted in FIGS. 5 and 6.

A mounting bracket 20 (FIGS. 1 and 2) is mounted to the rear side of the rear wall 12.2, and through the rearwardly spaced wall 20.1 of the bracket is journaled a drive shaft 20.3. The drive shaft terminates forwardly in a toothed worm gear 20.4 which rotates in a plane parallel to the thickened rear wall 14.6 of the magazine. An electric motor 20.5 mounted to the rear wall 12.2 drives a worm 20.6 meshing with the worm gear 20.4 and causing the latter to rotate. Carried by the shaft 20.3 between the worm gear 20.4 and the rear wall 20.1 of the bracket is a circular disc 20.7 having a peripheral camming projection 20.8 which, during each rotation of the disc, contacts and operates a microswitch 20.9 for a purpose which will subsequently be explained. The motor 20.5 is electrically reversible.

Extending forwardly from the periphery of the gear 20.4 is a camming pin 22. The forward end of the pin extends into and is slidingly retained in the grooves 14.8 in the rear wall of the magazine. The radius of the circular path transversed by the pin 22, as will now be evident, is identical to the radius of the circular grooves 14.8 such that when the pin swings through the position shown in FIG. 5, no camming action is imparted to the magazine by the pin. As the pin continues its revolution (as shown by arrow "c" in FIGS. 5 and 6) and reaches the cam abutment recess "p" provided by the upper intersection of the adjacent curved grooves (shown as "a" in FIG. 6), the pin is caused to bear against the side walls of the recess "p" at the intersection and thus cams the magazine to the left (FIG. 6) until the grooved path designated by arrow "d" comes into alignment with the path to be traversed by the pin, at which time the camming action of the pin ceases and the pin continues along the grooved pathway "d". The position of the magazine is hence not dependent upon the precise positioning of the pin near the bottom of its circular path. As will be evident from FIGS. 5 and 6, each revolution of the pin advances the magazine the exact distance necessary to replace the cartridge in the playing position with an adjacent cartridge. It will also be understood that if the pin 22 is continuously rotated in the opposite direction, the magazine 14 will be transported in the reverse direction. In this manner, once all of the tapes in the magazine have been played, the magazine may be returned to its original position for replaying of the tapes beginning with the first cartridge, as will now be described.

Figure 5:
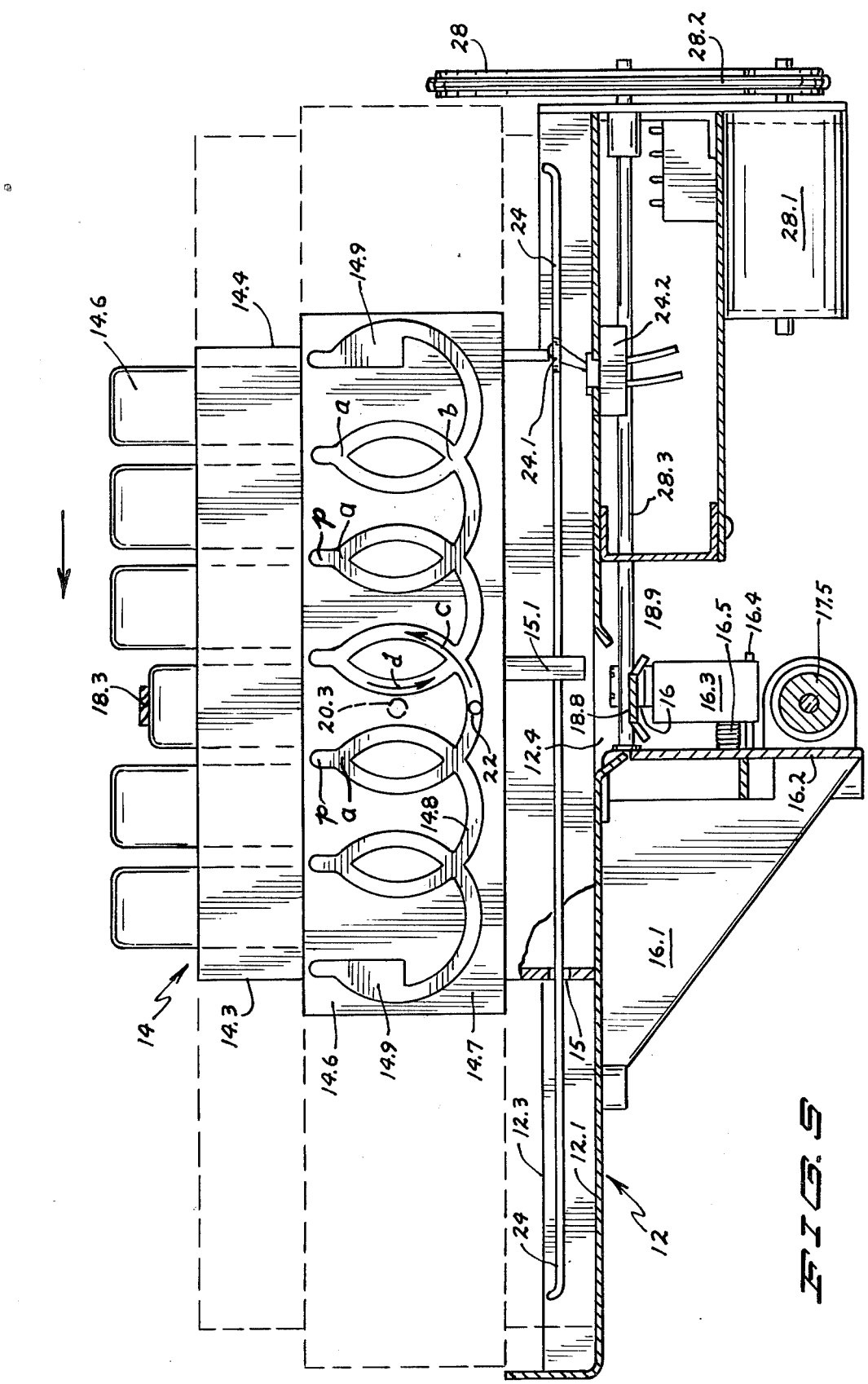
FIG. 5 is a cross-sectional view of the player-changer of the invention taken along line 5—5 of FIG. 1 and showing the device in a tape-playing position.

As shown best in FIGS. 1 and 5, an elongated switch control rod 24 extends nearly the entire length of the track and is slideably carried by the magazine. The rod passes through a slide hole 15 near the bottom, rear edge of the magazine and is retained in position by one or more lips 15.1 extending downwardly along the rear wall of the magazine. The ends of the rod 24 are bent forwardly, as shown best in FIG. 1, and come into contact with the ends of the magazine as the magazine reaches the respective ends of the slide 12.1. The rod is provided with a loop or bight 24.1 which at least partially encircles the toggle of a toggle switch 24.2. With reference to FIG. 1, it will be understood that as the magazine is moved to the left (each cartridge being sequentially played), the magazine will abut the leftmost forwardly turned end of the rod and move the toggle of the toggle switch 24.2 also to the left. As will be explained, this causes the motor 20.5 to reverse its direction of rotation, and in turn causes the magazine 14 to continuously step to the right (FIG. 1) until the magazine encounters the right-most forwardly turned end of the rod 24 and moves the toggle of the toggle switch to the right. This in turn again reverses the direction of rotation of the motor 20.5, so that the magazine may be stepped to the left for replaying of the magazine load of tape cartridges.

The press and lift slides 18.1, 18.2 are slideably supported in the mounting bracket 20 by means of vertical guides 30 of which one is depicted in FIG. 9. The press slide 18.1 has a forwardly extending pressure arm 18.3 at its upper end and which has a press foot 18.31 (FIG. 9) which extends over the magazine for downward, pressing contact upon that cartridge which is in the playing position. The foot 18.31 is in vertical alignment with the tape drive capstan 28.3 so as to avoid force components tending to tilt the cartridge and so as to press the rubber roller carried within the cartridge against the capstan with substantially only vertical force. That is, the press foot, rubber roller and capstan are in alignment. At its bottom end, the press slide is provided with rearwardly extending feet 18.4 of which one comes into downward operating contact with a microswitch 18.5 mounted to the bracket 20 (FIGS. 2, 7 and 9). Intermediate its height, the press slide is provided with a generally semicircular opening 18.6 through which the camming pin 22 protrudes forwardly. The upper surface of the opening 18.6 is generally circular to accommodate the movement of the camming pin as the latter rotates through the upper half of its path.

The lift slide 18.2 is slideably carried between the press slide 18.1 and the rear wall 12.2, and is joined by means of a helical tension spring 18.7 at its upper end to the pressure arm at the upper end of the press slide. At its lower end, the lift slide is provided with a forwardly extending lift arm 18.8 which extends forwardly within the opening 12.4 in the track so as to come into contact with the bottom surface of a cartridge and lift the same upwardly away from the transducer 16. The lift arm has a forward end with downwardly oriented side edges 18.9 to make gentle contact with a cartridge. At its sides, the bottom edge of the lift slide comes into downwardly bearing contact upon the rearwardly extending feet 18.4 of the press slide, and the press and lift slides are thus vertically urged together by action of the spring 18.7. The latter, however, permits the press slide to be urged upwardly against spring pressure from the lift slide, and, because of the vertical alignment of the press foot with the tape capstan, produces a fairly constant downward pressure (e.g., four pounds) on cartridges in the playing position.

The lift slide similarly contains a semicircular opening 19 intermediate its height, the upper, circular surface of which permits the camming pin 22 to revolve easily therein. The lower edge 19.1 of the semicircular opening 19 is generally horizontal, and forms a camming surface against which the pin 22 bears as it describes the lower half of its revolution, thereby camming downwardly the lift slide and the press slide which is connected to the lift slide 18.7. A helical spring 19.2 (FIGS. 7 and 8) is connected at its upper end through bracket 19.3 to the rear wall 12.2, and is fastened at its lower end to the press slide 18.1 so as to urge the press slide in an upwardly direction. As will now be understood, when the camming pin 22 is not in downwardly camming contact with the camming edge 19.1 of the lift slide, the lift and press slides are urged upwardly by action of the spring 19.2. The upper curved surfaces of the generally semicircular openings 18.6, 19 permit the cam 22 to ride therealong to cam the slides upwardly in aid of the spring 19.2.

FIGS. 5 and 7 show the apparatus in a cartridge playing position with the cam pin 22 at generally the bottom of its path of rotation, with the lift slide held in its downward position by action of the cam pin, and with the press slide similarly held downwardly by action of the spring 18.7. When a new cartridge is to be moved into the playing position, the motor 20.5 is activated as will be described and the gear and pin 22 are rotated in the direction shown by the arrow "c" in FIGS. 5 and 6. As the pin 22 is thus rotated upwardly into the position shown in FIGS. 6 and 8, the press and lift slides are urged upwardly by the spring 19.2 and, if need be, are cammed upwardly by the camming engagement of the pin 22 against the semicircular surfaces of the openings in the slides. When the pin 22 has reached the position shown in FIGS. 6 and 8, and when the slides have thus substantially reached their uppermost position, the pin comes into contact and slides upwardly into the recess "p" as described in detail above, thereby moving the magazine 14 to the left in FIG. 6 to advance the adjacent cartridge into the playing position. As the pin 22, having advanced the magazine, leaves the recess "p" and descends in its path along the groove shown in "d" in FIG. 6, it again contacts the horizontal edge 19.1 of the lift slide to force the latter into its downward position, the pressure slide following under the action of the spring 18.7 to press a cartridge downwardly in the playing position. In this manner, the magazine is advanced along the track 12.1 only when the lift and press slides are in their uppermost position with the cartridge raised into the magazine, thereby avoiding damage to the tape cartridge.

Transducer stepping and step-counting means are provided for stepping the transducer 16 so as to come into playing contact with different tracks of a single tape in a cartridge, as will now be described.

A mount 16.1, mounted beneath the track 12.1, provides a vertical wall 16.2 adjacent one edge of the opening 12.4 in the track. An end-of-tape sensor 26 is mounted to the wall 16.2 and includes a pair of upwardly oriented contacts 26.1 in the path traveled by a tape as the latter is played. Endless magnetic tapes of the type described above are provided with a short length of conductive material ("sensor tape") which forms an electrical conduction path between the contacts 26.1 to signal that the end of a tape recording has been reached.

Referring particularly to FIG. 11, the transducer 16 is mounted to a carriage 16.3 which is carried slideably on slide pins 16.4 permitting the transducer and its carriage to move longitudinally of the track 12.1 a short distance. A spring 16.5 mounted between the wall 16.2 and the carriage urges the carriage outwardly (to the left in FIG. 11) away from the wall 16.2. The carriage includes a generally downwardly extending cam follower arm 16.6.

A rotatable camming member, depicted as camming disc 16.7, is rotatably mounted to the wall 16.2 by means of shaft 16.8, and the disc has a peripheral rim 16.9 providing adjacent camming surfaces "l", "o", "s" between which are flats "k", "m", "t", "v", etc. The cam follower arm 16.6 of the carriage is biased by the spring 16.5 into camming contact with the camming surfaces 16.9 as shown best in FIG. 11. When 8-track endless magnetic tapes are to be played, the transducer is thus provided with four separate playing positions by the camming disc 16.7 corresponding to the four flats "k", "m", "t", and "v", the transducer sensing two tracks of the tape in each position. A fifth flat, "n", coplanar with the flat "v", is also provided on the peripheral rim of the camming disc, the flat "n" providing a resting place for the cam follower arm 16.6 when cartridge advancement is initiated, as will be described below.

When a fresh tape cartridge has been advanced to the playing position, the camming disc 16.7 is in its first position in which the follower arm 16.6 abuts the flat "k". To advance the transducer to the next pair of tracks in the tape, the camming disc 16.7 is rotated through, e.g., 72°, thereby causing the follower arm 16.6 to be cammed by the slanting surface "l" into its next position on the flat "m". The camming disc 16.7 is thus rotated at intervals to step the transducer so that all of the tracks of the tape (e.g., four), are played in sequence. Rotation of the camming disc is activated by the end-of-tape sensor 26 as the end of each pin of tape track is sensed. When the final tracks of a cartridge have been played, the camming disc is rotated to a fifth position, the follower arm sliding, without movement of the transducer, from the flat "v" to the flat "n" (FIGS. 12 and 13). Such further rotation of the camming disc causes a camming projection 17 thereon to contact and operate a microswitch 17.1 which in turn activates the cartridge advancement means. As will be described, the latter activates further rotation of the camming disc when the finished cartridge has been lifted away from the capstan and transducer. Such further rotation of the camming disc from its fifth position permits the follower arm 16.6 to slide over the edge separating the flats "n" and "k" of the cam disc into its original position on surface "k".

Rigidly attached to the cam disc 16.7 is an axially extending toothed gear 17.2 which, in the case of a changer for 8-track magnetic recording tapes, may have five teeth as shown in FIG. 10. A ratchet cam 17.3 is provided having an irregularly shaped, sharp edged opening 17.4 therein, the latter loosely encircling the toothed gear to rotate the latter. The ratchet cam is attached rearwardly to the spring-loaded plunger 17.4 of a solenoid 17.5 which, when momentarily activated, cycles the ratchet cam 17.3 rearwardly and forwardly. The sharp edged interior of the cycled ratchet cam causes the toothed wheel 17.2 to rotate, as shown in FIG. 10. In the embodiment depicted, each operation of the solenoid rotates the wheel 17.2 through 72° to thus rotate the cam disc 16.7 as described above.

Although the camming disc and ratchet cam have been described above as providing for five rotational positions for the camming disc during each full revolution, it will be understood that the camming disc may have greater or fewer positions. If x is the number of different transducer positions for a given tape cartridge (x equaling four for an 8-track stereo tape), and if y is the number of full tapes to be played for a single revolution of the camming disc, then the number of rotational positions or "flats" in the camming disc will be y(x+1). In practice, with 8-track tapes, we desire to provide the camming disc with either five (as described) or ten rotational positions. For tapes with e.g., four tracks, x would equal two and the number of rotational positions provided by a full revolution of the camming disc would be three or a multiple of three.

A flywheel 28 (best seen in FIG. 4) is rotatably mounted to the player-changer at one end thereof, and is driven by means of an electric motor 28.1 operating through one or more flexible belts 28.2. A capstan 28.3, extends from the center of the flywheel longitudinally beneath the track 12.1, and is rotatably journaled into the wall 16.2. As referred to above, an 8-track endless magnetic tape cartridge commonly includes an internal rubber roller adjacent the exposed section of tape and over which the tape is trained. The capstan 28.3 in the player-changer of the invention is positioned in straight line orientation with the press slide foot 18.31 and the cartridge rubber roller so as to squeeze the tape between the capstan and the roller with substantially constant force to thus drive the tape as the capstan is rotated. The capstan 28.3 is thus rotatably supported at its ends, and the tape driving portion of the capstan is located between its ends but as close to the end journaled into the wall 16.2 as is practicable. Thus arrangement lends stability to the rotational axis of the capstan at its tape contacting position, and permits the use, if desired, of capstans having less resistance to bowing then is customary.

From FIG. 2 it will be noted that the player-changer is provided at its upper surface with an externally operable on-off volume switch 32 and also a transducer stepping switch 34.

A simplified version of the electrical schematic omitting, for clarify, the audio system, is shown in FIG. 14. With the apparatus in the "on" position (switch 32), the capstan motor 28.1 is continuously energized. The worm motor 20.5 and the solenoid operating the transducer stepping mechanism (shown as 17.5) are connected in parallel. With respect to the transducer stepping circuitry, it will be seen that the solenoid 17.5 is energized when the end-of-tape sensor contacts the conductive "sensor" strip of tape, or when the microswitch 20.9 (FIG. 9) is closed by the full rotation of the gear 20.4, or when the stepping switch 34 (FIG. 2) is operated. The worm motor 20.5 is connected to the power source through the reversing switch 24.2. Referring to FIG. 1, if the switch 24.2 is moved by the switch control rod 24 following the completion of a magazine of tape cartridges, the motor 20.5 is continuously energized in one direction of rotation to continuously and sequentially step the magazine toward the other end of the track upon which it rides, whereupon the switch 24.2 is moved to its other position. When in the latter position, rotation of the motor 20.5 is controlled by the microswitches 17.1, 18.5. Microswitch 17.1 is operated by the peripheral projection 17 on the camming disc 16.7, and is thus closed momentarily during each revolution of the latter. Microswitch 18.5 (FIG. 2) is wired to be closed when the arm 19.4 thereof is spaced away from the switch body, as shown in FIG. 2.

In operation, the magazine 14 is placed in its far left position in FIG. 1, the housing of the player-changer having a large opening in its upper surface to permit tape cartridges to be inserted in the magazine. The player-changer is turned on and, assuming the toggle switch 24.2 is in the position shown in FIG. 2, the worm motor 20.5 is continuously energized to sequentially step the magazine 14 to the starting position, which is to the right in FIG. 1. When the magazine reaches its far right position, its abutment against the forwardly turned end of the control rod 24 moves the toggle switch 24.2 into the position shown in FIG. 1, and the first pair of tracks of the first cartridge is played.

In the playing position, the microswitches 17.1 (FIG. 10) and 18.5 (FIG. 2) are both in the open position. When the first tracks of the tape have been completed, the conductive "sensor" strip momentarily closes the circuit between the arms of the end-of-tape sensor 26 to energize the solenoid 17.5 and hence to rotate the camming disc 16.7 to its next adjacent rotational position, the latter camming the transducer 16 (FIG. 11) toward the supporting wall 16.2 by a distance sufficient to place the transducer in playing position on another pair of tape tracks. With an 8-track tape, this procedure is repeated two more times (so that the third and fourth pairs of tracks are played), thereby completing the playing of the cartridge then in the playing position.

As the end-of-tape sensor 26 senses the completion of the last tape tracks, the solenoid 17.5 is energized to rotate the camming disc 16.7 through another 72° arc with the cam follower arm 16.6 of the transducer carriage 16.3 following without movement along the flat "n". Concurrently, the peripheral camming projection 17 of the camming disc momentarily actuates the microswitch 17.1 (FIG. 10). The latter microswitch actuates the worm motor 20.5, and rotation of the worm gear 20.4 is thus initiated. As the press slide 18.1 begins its upward travel, the microswitch 18.5 (FIG. 9) is closed, and in this manner the worm motor 20.5 is continuously energized as the worm geat 20.4 completes a single revolution. Rotation of the worm gear 20.4, and concurrent rotation of the cam disc 20.7 (FIGS. 1 and 9) momentarily closes the microswitch 20.9 to again actuate the solenoid 17.5. The resultant further rotation of the camming disc 16.7 permits the transducer carriage follower arm 16.6 to slip over the step separating the flats "n" and "k" and to seat against the surface "k". This occurs (FIG. 11) only after the played cartridge has been raised by the lift arm 18.2, and before a new cartridge has been lowered into the playing position. As the worm gear 20.4 completes its rotation to place a new cartridge in the playing position, the lower end of the press arm 18.1 opens the microswitch 18.5, thereby halting rotation of the worm motor 20.5.

When the final tracks of the final cartridge in the magazine have been played, the next step of the magazine (to the left in FIG. 1) causes the magazine to abut against the forwardly turned end of the switch control rod, reversing the switch 24.2 whereupon the rotation of the worm motor 20.5 is reversed and the magazine is continuously stepped again to the right to its initial position in readiness for replaying of the first cartridge. In this manner, the player-changer of the invention can be employed to endlessly play a series of cartridges held in the magazine. If desired, of course, the switch 24.2 may be so wired as to turn off the player when the magazine has reached the far left position in FIG. 1.

It will be understood that the camming disc 16.7 provides a logic function in that it not only steps the transducer carriage from one tape track to the next, but in addition counts the number of tape tracks which have thus been traversed by the transducer and causes an adjacent cartridge to be moved into the playing position. For example, with an 8-track tape, and using the five-position camming disc described above, the first four rotational positions of the camming disc correspond to the four pairs of tape tracks to be played, the camming disc advancing the transducer from one pair of tracks to the next adjacent pair of tracks with each 72° revolution. When the end of the fourth pair of tape tracks has been sensed, further revolution of the camming disc 16.7 through an additional 72° arc into its fifth rotational position causes the peripheral projection 17 of the camming disc to actuate the microswitch 17.1, whereupon the series of events leading to a new tape cartridge being moved into the playing position are set in motion. This series of events includes further rotation of the camming disc through an additional 72° of arc, the cam disc permitting the transducer carriage to return to its original position for playing the first pair of tracks of the new tape cartridge. The camming disc 16.7 thus not only operates to move the transducer carriage, but in addition serves to count the number of tracks for each cartridge tape which have been played and to initiate the cartridge changing procedure when all of the tracks of a given tape cartridge have been played.

Thus, it will be evident that the camming disc 16.7 provides a simple and inexpensive logic system for the player-changer of the invention, and further permits avoidance of costly and highly sophisticated electronic logic circuits.

Referring to the embodiment of FIGS. 15–20, wherein like reference characters have been applied to the same or functionally equivalent elements for the purpose of expediting understanding of my invention, FIG. 15 shows a sketch of an 8-track cartridge playing apparatus similar to that shown in U.S. Pat. No. 3,592,975, assigned to the assignee of the instant invention.

In these figures, a tape playing apparatus is indicated generally by reference character 10A and includes a circular tape cartridge magazine indicated by reference character 14A that is provided with a radially spaced plurality of 8-track cartridge receiving slots that are open at the top and bottom ends, similarly to the first described embodiment. Circular cartridge magazine 14A is suitably disposed for rotary movement on top of the base 11A of cartridge player 10A. Circular cartridge magazine 14A also includes a plurality of circumferentially spaced slots, 14.7A, for purposes to be described below.

As will be seen, cartridge player 10A is provided with a stepping and indexing mechanism for providing sequential playing of the cartridges disposed in magazine 14A. Although not not shown on the drawings, a tape head assembly, including means for playing a cartridge as well as means for determining the beginning and end of a program on a cartridge and providing an output signal indicative of the end of a program has been described in detail above and need not be described as such in connection with the operation of this embodiment. Suffice it to say, a cartridge handling station is disposed adjacent the periphery of tape magazine 14A and includes a mounting bracket 20 in which are slideably disposed a pressure slide 18.1 and a lifting slide 18.2, each having apertures disposed about a shaft 20.3 upon which is disposed a worm gear 20.4 that includes camming pins 22 and 22.1 and camming pin 22.8, as well as a further cam 22.9.

Gear 20.4 is suitably driven from a shaft 20.51 that is driven by appropriate motor means (not shown) as, for example, illustrated as motor 20.5 in the foregoing description of a preferred embodiment. Shaft 20.51 is provided with a worm drive portion 20.6 at its upper end and is held into engagement with the outer periphery of worm gear 20.4 by suitable spring means. The construction of worm drive portion 20.6 is facilely provided by winding a coil of spring material substantially the diameter of shaft 20.51, disposing the same on shaft 20.51 and suitably securing the spring to the shaft by, for example, solder, or the like.

Referring to FIG. 18, a latch assembly is indicated generally by reference character 35 and includes a latch lever 36 having a first end 37 for engaging slots 14.7A in magazine 14A, and a further end 38 for engagement by camming surface 22.9 on worm gear 20.4. Lever 36 is journaled for rotation on an upstanding pin 39 and is biased in the manner desired by tension spring 40.

Reference is made to the corresponding sliding portions of the pressure and lift slides in the first described embodiment as including the semicircular apertures through which a pin, on worm gear 20.4 may extend for suitable operation during the cycle of operation of the magazine advancing mechanism. In the embodiment of FIGS. 15–20, pin 22 is shown as having a further portion 22.1 extending through these apertures in the pressure and lift slide mechanisms in a manner similar to that described above and functionally the operation is the same.

In the first described embodiment, a cycle end switch was disposed under the lower portion of the lift member 18.2. In view of the available space in the present embodiment, switch 18.5 has been disposed on or near the top surface of base 11A and is designed to be responsive to a further pin 22.8 that is suitable disposed to extend outwardly from one of the surfaces of worm gear 20.4 to engage switch 18.5 and cause it to open the power supply to motor 20.5 substantially the same time as magazine lock 35 engages the next succeeding vertical slot 14.7A in cartridge 14A.

FIG. 20 is a simplified schematic diagram indicating the manner in which motor 20.5 is energized. Normally open switch 17.1 is momentarily closed upon receiving the end of cartridge signal from the tape head control at the playing station. This energizes motor 20.5 and as shaft 20.51 rotates, gear 20.4 rotates and pin 22.8 releases normally closed switch 18.5 to maintain the energization of motor 20.5.

OPERATION

In a manner similar to the above described operation of a preferred embodiment, the operation of the apparatus illustrated in FIGS. 15–20 is as follows; assuming that a cartridge is in a lower position in engagement with the tape head operating mechanism and the cartridge is nearing the end of, for an 8-track cartridge, track No. 4, the end of track signal will initiate the above described procedure which will result in the closing of a switch 17.1 (not shown) to start motor 20.5. This results in the start of a one revolution rotation of gear 20.4, during which the rotary magazine 14A will be indexed one step and, at the end of the single revolution, the cartridge will be in position for playing through the sequence of tracks associated with the type of cartridge employed. In the "at rest" position of gear 20.4, pin 22.8 is in engagement with normally closed switch 18.5 disposed adjacent the rear face of gear 20.4. As motor 20.5 rotates gear 20.4 through worm 20.6, pin 22.8 will be disengaged from normally closed switch 18.5 and it will close to maintain the energization of motor 20.5 until gear 20.4 has been rotated a full revolution. Shortly after the initial energization or closing of switch 17.1, it will open according to the signal present at the appropriate output of the tape playing apparatus as described above. As the initial rotation of gear 20.4 occurs, a raised camming surface 22.9 engages end 38 of magazine lock lever 36 to cause rotation thereof about pin 39 so that end 37 is disengaged from the vertical notch 14.7A in magazine 14A. As rotation continues, pin 22.1 engages lifting and pressure slides in the manner described above to perform the lifting function followed by the pressure function in the necessary sequence to first place a cartridge in its at rest position in magazine 14A after which pin 22 engages an adjacently disposed vertical slot 14.7A and indexes, or rotates, magazine 14A to a next position whereat a fresh cartridge is disposed above the cartridge playing mechanism. At this point, magazine lock lever 36 is free to engage a new, successive slot 14.7A as it is no longer in engagement with cam 22.9 and completion of the single revolution positions the pressure slide so as to allow the lowering of a cartridge into playing engagement with the tape playing station and the single revolution will be terminated when pin 22.8 engages normally closed switch 18.5 to thereby open it and deenergize motor 20.5.

We claim:

1. In a magnetic tape player-changer for automatically sequentially playing multi-track endless magnetic tapes housed in cartridges;

a transducer;

a magazine for housing a plurality of the cartridges, and a track guiding the magazine for sequentially advancing cartridges into a playing position with respect to the transducer, the magazine having a surface provided with a plurality of intersecting grooves;

means for sequentially advancing the magazine to sequentially position the cartridges into a playing position and including a revolvable cam with a pin riding in said grooves and single revolution driving means therefor, the cam pin and grooves coating to smoothly advance the magazine to position sequential cartridges in the playing position in response to sequential single revolutions of the cam; and transducer stepping and counting means for stepping the transducer from one track or track pair to another of a tape and for counting the number of steps afforded the transducer for each tape, and including means for signaling the cartridge advancing means to advance a new cartridge into the playing position when all of the tracks of the preceding cartridge have been played and the corresponding number of steps have been counted and to return the transducer to its initial position for playing the first track or track pair of the tape in the new cartridge.

2. In a magnetic tape player-changer for sequentially playing magnetic tapes housed in cartridges movable into a playing position in the player-changer; and including a transducer;

a magazine for housing a plurality of cartridges and a track guiding the magazine for sequentially positioning cartridges in the playing position with respect to a transducer, the magazine having a surface provided with a plurality of intersecting, curved grooves, and the player-changer having a revolvable cam with a pin riding in said grooves and single revolution driving means therefor, the cam pin and grooves coacting to smoothly advance the magazine to position sequential cartridges in the playing position in response to sequential single revolutions of the cam.

3. The player-changer of claim 2 wherein the curved grooves in the magazine are generally circular and are aligned along the direction of travel of the magazine, each circular groove intersecting and adjacent circular groove at two points, each groove having recessed abutment means adjacent one of its intersections with an adjacent groove and positioned for driving engagement by the cam during a portion of the revolution of the latter to advance the magazine along the track.

4. The player-changer of claim 2 wherein said curved grooves are generally circular and are aligned in a plane parallel to the direction of travel of the magazine, and wherein the cam revolves in a circle about a stationary axis normal to the plane of the grooves, the grooves having a radii of curvature equal to that of the circular path of the cam and each circular groove having first and second intersections with an adjacent circular groove with said first intersections being aligned parallel to the path of travel of the magazine, said first intersections having a recess with walls defining cam abutments engageable by the cam to advance the magazine in the track.

5. The player-changer of claim 2 including means sensing when the magazine has completed its travel in the track for reversing the rotation of the cam to hereby reverse the direction of travel of the magazine.

6. The player-changer of claim 2 including means for stepping the transducer parallel to the direction of travel of the magazine from one track or track pair to another of a multi-track magnetic tape.

7. The player-changer of claim 2 including cartridge positioning means responsive to rotation of the cam for sliding a cartridge with the magazine into and out of playing engagement with the transducer.

8. The player-changer of claim 7 wherein the cartridge positioning means comprises lift and press slides movable substantially together to respectively withdraw a cartridge from playing contact with the transducer before the magazine is advanced in the slide, and to bring a cartridge into playing contact with the transducer after the magazine has been thus advanced.

9. The player-changer of claim 7 including transducer stepping and counting means for stepping the transducer from one track or track pair to another of a tape and for counting the number of steps afforded the transducer for each tape, and including means for signaling rotation of said cam to advance a new cartridge into the playing position when all of the tracks of the preceding cartridges have been played and the corresponding number of steps have been counted, and to return the transducer to its initial position for playing the first track or pair of tracks of the tape in the new cartridge.

10. The player-changer of claim 8 including a tape-drive capstan in engagement with the tape of a cartridge in the playing position to drivingly squeeze the tape between it and a drive roller in the cartridge, and wherein the press slide has a pressing foot aligned in the direction of sliding with the capstan and roller to press the tape carried by the roller directly against the capstan.

11. A magnetic tape player-changer particularly adapted to playing 8-track endless magnetic tapes housed in cartridges, and comprising a magazine having side walls and an open top and bottom, and including spaced webs between the side walls dividing the magazine into a plurality of cartridge-holding compartments with the cartridges held parallel to one another; an elongated generally horizontal track slideably supporting the magazine and having an upwardly open opening intermediate its end exposing a transducer, the magazine being slideable along the track to sequentially position cartridges above the transducer in a playing position; one side wall of the magazine having a plurality of intersecting; generally circular grooves lying in a plane parallel to the direction of travel of the magazine, each generally circular groove having upper and lower intersections with an adjacent circular groove, the upper intersections having upwardly extending recesses with walls providing cam-abutting surfaces; a cam with a pin revolvable in a circle about a stationary axis normal to the plane of the grooves with the cam pin extending into and riding in the grooves, the circular grooves having radii of curvature matching that of the circular path of the cam pin; and means for rotating said cam whereby, in each rotation of the cam, the latter rides in a circular groove and enters an upwardly extending recess at the upper intersection to advance the magazine into a position in which the cam may ride downwardly in the adjacent circular groove, sequential single revolutions of the cam advancing the magazine to position sequential cartridges in the playing position.

12. In a magnetic tape player-changer for sequentially playing magnetic tapes housed in cartridges movable into a playing position in the player-changer; and including a transducer;

a rotatable magazine for housing a plurality of cartridges for sequentially positioning cartridges in the playing position with respect to a transducer, the magazine having a surface provided with a plurality of circumferentially spaced apart vertical, open ended slots, and the player-changer having a revolvable cam having a pin on a rotatable disk on an axis perpendicular to the axis of said magazine and including single revolution driving means therefor said pin moving into and out of said slots, the cam and slots coacting to smoothly advance the magazine to position sequential cartridges in the playing position in response to sequential single revolutions of the cam.

13. The apparatus of claim 12 in which the magazine is circular.

14. A magnetic tape-player changer particularly adapted to playing 8-track endless magnetic tapes housed in cartridges, and comprising a magazine having sidewalls and an open top and bottom, and including spaced webs between the sidewalls dividing the magazine into a plurality of cartridge holding compartments; a transducer in cartridge engaging operative position with respect to the travel of said magazine, the magazine being rotatable thereabove to sequentially position cartridges above said transducer in a playing position; the outer sidewall of said magazine having a plurality of vertically extending slots for operatively receiving a cam; and a cam including a pin revolvable in a circle about a stationary axis normal to the plane of the slots, with the pin on said cam extending into and riding in the slots; whereby, sequential single revolutions of the cam advance the magazine to position sequential cartridges in the playing position.

* * * * *